Feb. 3, 1970     S. M. WEINBERGER     3,493,798
HYSTERETIC DAMPER
Filed Oct. 2, 1967
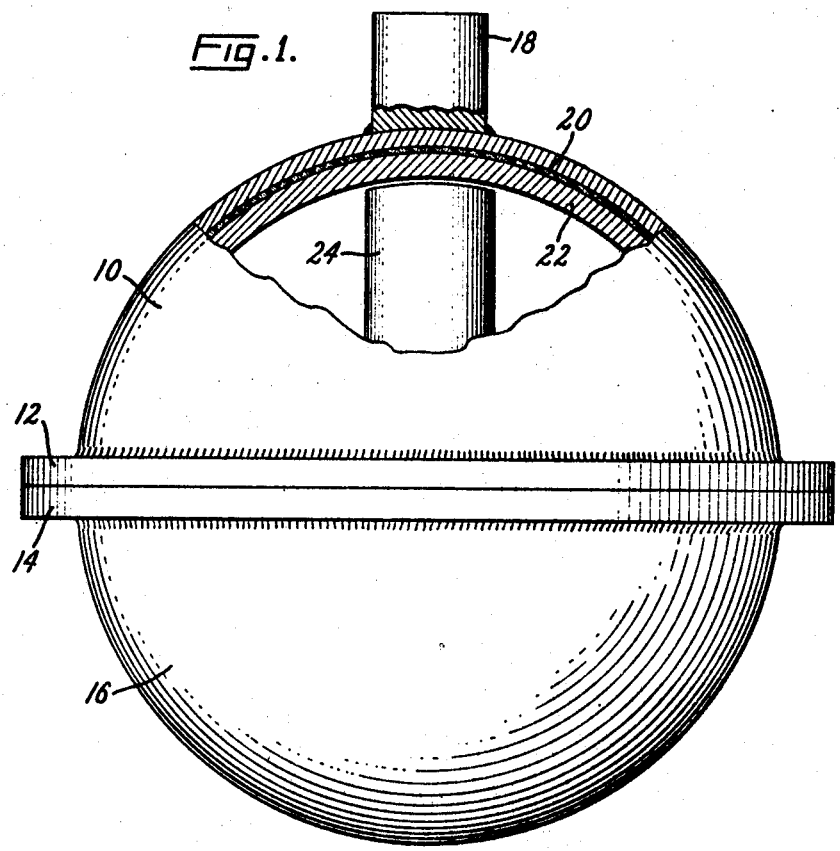
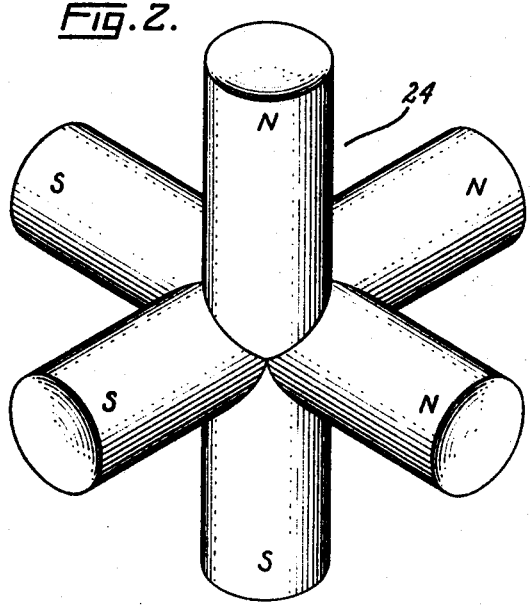
INVENTOR:
SANFORD M. WEINBERGER,
BY Henry W. Kaufmann
AGENT

United States Patent Office 3,493,798
Patented Feb. 3, 1970

3,493,798
HYSTERETIC DAMPER
Sanford M. Weinberger, Wynnewood, Pa., assignor to General Electric Company, a corporation of New York
Filed Oct. 2, 1967, Ser. No. 672,277
Int. Cl. H02k 49/10
U.S. Cl. 310—93                               6 Claims

ABSTRACT OF THE DISCLOSURE

Damping by hysteresis with disproportionately small force of magnetic attraction is provided by suspending fine particles of high-hysteresis ferromagnetic material in nonmagnetic matrix (e.g., plastic binder). Hysteresis is proportional to mass of ferromagnetic material, but permeability is much less than proportional. Alternately, thin magnetic films of similar properties are used.

REFERENCE

Application S. N. 362,216; Apr. 24, 1964, now U.S. Patent No. 3,399,317, L. K. Davis.

SPECIFICATION

This invention pertains to mechanical motion damping devices.

Mechanical damping is desirable in many potentially oscillatory mechanical systems. Bodies in stable equilibrium usually fall in such a class. A special case of such bodies is the freely moving space vehicle which is directed toward a particular attitude with respect to another body by the action of ambient fields. In copending application for U.S. Patent Ser. No. 362,216, filed Apr. 24, 1964, by L. K. Davis, now U.S. Patent No. 3,399,317, for Motion Damper, which application is assigned to the assignee of the present application, it is taught how the oscillations of a space vehicle stabilized with respect to the local gradient of the gravitational field may be damped by affixing to the vehicle a hollow shell of diamagnetic material which surroundings a free member comprising permanent magnet material. The free member is "floated" free of the housing by the repulsion between its magnetic fields and the diamagnetic shell. Means are provided for damping relative motion between the free member and the shell. It is to an improved damping means that the present invention pertains.

The use of magnetic hysteresis to damp relative motion between a magnetic field and a hysteretic member has long been known. For example, in synchronous motors the rotating field may profitably be provided with solid cast pole pieces whose hysteresis contributes to the starting torque, which tends to damp the relative motion between the rotating field of the stator and the initially motionless field structure. More recently various schemes have been used for damping the oscillations of space vehicles by dissipating the oscillatory energy in hysteretic ferromagnetic materials. In all the prior art cases, the hysteretic material has been firmly held against movement into contact with the pole pieces which constitute the source of the magnetizing field which causes the hysteretic losses. This has been necessary because magnetic hysteresis is found (at least in usefully great magnitudes) only in ferromagnetic materials, which are also characterized by high permeability. A consequence of this fact is that massive pieces of hysteretic material tend to be unstable when placed in a magnetic field, tending to move toward the magnetic poles which constitute the source of the field. Hysteretic damping has certain advantages over other known forms of damping; it is free of the sealing and venting problems which inhere in the use of viscous fluids, and tends to be less temperature dependent; and it will in general be smaller in size than an eddy-current damped damper of equal capability. However, prior to my invention the use of hysteretic material to provide damping in a diamagnetically suspended damping device, such as that of Davis, has not been possible because the magnetic attraction of the highly permeable hysteretic material provided for damping would overcome the relatively weak diamagnetic repulsion relied upon to keep the purportedly free member actually free to move, and would thus render the device inoperative.

I have invented a method and produced thereby a product which has a higher ratio of hysteresis to permeability than does the bulk ferromagnetic material from which it is made. The improvement so produced is of such magnitude that it is possible to modify the damper of Davis by surrounding the diamagnetic shell of his invention with another shell of my improved material, whose hysteresis losses are sufficiently high to provide useful damping, but of permeability sufficiently low so that its attraction does not overcome the diamagnetic repulsion of the diamagnetic shell.

Briefly, I achieve these novel and beneficial results by employing ferromagnetic material of high hysteresis loss (such, for example, as ferroferric oxide or the aluminum-nickel-cobalt alloy known commercially as "Alnico V") in finely divided form, dispersed in a nonmagnetic carrier or matrix such as a conventional plastic. The air gap existing at each end of such a fine particle causes the effective or apparent permeability of a dispersion of such particles to decrease more than proportionally to the decrease in total volume of ferromagnetic material in a given volume of the dispersion; but the hysteresis loss remains strictly proportional to the volume of ferromagnetic material.

In the magazine "Radio" for November, 1945, in an article entitled, "Effective Permeability of High Frequency Iron Cores," Polydoroff and Klapperich give the following formula:

$$\mu' = \frac{\mu - \tfrac{2}{3}\delta(\mu-1)}{1 + \tfrac{1}{3}\delta(\mu-1)}$$

where $\mu'$ = the effective permeability of a dispersion of ferromagnetic material
$\mu$ = the permeability of the ferromagnetic material in bulk or large sample
$\delta$ = the fraction of the total volume occupied by nonmagnetic material.

Thus, for example, particles of Alnico (which has a permeability of about 5) if dispersed to a concentration of one percent by volume (making the parameter $\delta$ equal to ninety-nine percent) will demonstrate an effective permeability of only 1.017. The hysteresis loss, on the other hand (for particles down to one micron in size) will be one percent of that demonstrated by a solid piece of Alnico.

For the better understanding and explanation of my invention I have provided figures of drawings in which FIG. 1 represents schematically in a partially cut away form an embodiment of my invention and FIG. 2 represents pictorially a form of free member which is particularly well adapted to use in the embodiment of FIG. 1.

FIG. 1 represents an approximately hemispherical housing 10 having a flange 12 which mates with flange 14 of a matching hemispherical housing 16. Housing 10 is provided with some connecting means 18 (which may, for example, be a threaded boss) for the connection to the system to be damped. Conventional means such as bolts, lockwashers, and nuts not further identified are employed to join housings 10 and 16. All the preceding identified elements should be nonmagnetic and may conveniently be of aluminum alloy. Inside housings 10 and 16 is a closely fitting split sphere 20 of a dispersion of finely divided highly hysteretic magnetic material in some nonmagnetic solid material, such as an organic plastic inert to the materials with which it is in contact. It is formed of similar hemispheres, inside 10 and 16 mating to form a complete sphere. Inside sphere 20 is a repeller 22, also spherical in shape, formed by mating of similar repeller hemispheres inside housings 10 and 16 to form a complete repeller sphere. The repeller 22 must be of diamagnetic material and may conveniently be of bismuth metal or of pyrolytic graphite, both of which are among the most highly diamagnetic materials known. Inside repeller 22 there is a cruciform permanent magnet 24, only partly represented in FIG. 1 but shown in full in FIG. 2; it has substantially the geometry of a jackstone, its ends being suitably chamfered to provide a close fit within the repeller sphere 22.

Thus, to recapitulate, an outer non-magnetic housing (10 and 16) surrounds a hollow sphere 20 of highly hysteretic low-permeability material which in turn surrounds a hollow sphere 22 of diamagnetic material; and inside of all is the cruciform permanent magnet 24.

As may be observed from FIG. 2, three neighboring poles of magnet 24 are made north poles, and the remaining three neighboring poles are made south poles, so that the entire magnet 24 has a considerable magnetic moment. Because of the limited permeability of hysteretic sphere 20, magnet 24 will produce, despite the partial shielding of sphere 20, a magnetic field external to housing 10–16 which will interact effectively with an externally ambient magnetic field to restrict rotation of magnet 24. As is explained by Davis, such an interaction is beneficial in restraining magnet 24 from freely following the rotations of the outer housing 10–16 responsively to the torques created by the damping means. By "anchoring" the inner member to an external ambient field the damping effect is enhanced. Thus it is desirable that the polarity of the various poles of magnet 24 be not random, but such as will produce the largest magnetic moment, other things being equal.

The preceding observations raise the question why a single bar magnet would not suffice to replace magnet 24. It would not adequately replace it for the simple reason that a sufficient number of pole faces must be presented, so distributed in angle, that any displacement of the center of the magnet structure will cause at least one pole face to approach markedly closer to the diamagnetic re-repeller 22, producing a restoring force which will tend to center the magnet structure again. This is conveniently achieved by the cruciform or jackstone, although it could also be achieved by the spherical inner free member of Davis.

As to dimensions of the structure, the inner diameter of repeller 22 in one embodiment was 4 inches. It was made of pyrolytic graphite, and had a wall thickness of 0.1 inch. Sphere 20 was made with walls 0.025 inch thick; it was made by mixing 20% by weight of powdered iron oxide of particle size 10 microns diameter in 80% by weight of fluid plastic bisphenol-A epoxy, suspending it thoroughly. This was cast in a mold in which it formed a solid piece from which the two mating hemispheres were turned out.

Magnet 24 was cast and its pole ends were ground to approximately match the inside shape of repeller 22, the magnet 24 being made sufficiently small to rotate freely inside repeller 22 in a gravity-free condition. The poles were approximately one inch in diameter.

Relative thicknesses of the walls of repeller 22 and sphere 20 are determined by their relative permeabilities. To a first very rough approximation, it may be stated that the wall thickness of sphere 20, multiplied by its permeability less one, must be less than the wall thickness of repeller 22, multiplied by one less its permeability. This is merely a very crude approximation to a formulated statement that the net attraction of the sphere 20 must be less than the repulsion of repeller 22 for magnet 24.

The size of the particles of hysteretic material is not critical, provided it is sufficiently small. The rough general rule is that the particle maximum dimension must be such that the net magnetic field produced by an individual particle is negligibly small at an average particle spacing from it—that is, statistically speaking, at an adjacent particle.

The preferred form of my invention presents the diamagnetic repeller immediately adjacent to the pole faces of the free central member, with the hysteretic member farther away from the pole faces. This is preferred for the purely quantitative reason that it is the slight differences in repulsion produced by slight displacements of the central member that constitute the net central restoring force upon it. Since magnetic forces (despite the fictitious nature of magnetic poles) follow an inverse square law, it is desirable that the distance from the pole face to the repeller be minimized.

An exception to this preference may occur if one practices my invention by using a thin film of ferromagnetic material to provide the hysteretic damping. Such films are widely used in magnetic memories for digital data storage, and have essentially rectangular magnetization loops. In consequence of this, they show high hysteresis loss, but their variational permeability is very low except at the coercive force, at which approximately constant magnetizing force they show a high but transient permeability. Since only a small part of such film will, in the present application, be at the coercive force at any time, the overall permeability of the film be too low to produce a strong attractive force. Since such a film may be made very thin, it may be applied to the inner surface of the repeller without significantly increasing the spacing between the repeller and the pole face of the free member. Thus the preference indicated will not necessarily exist if a thin hysteretic film is used, rather than the dispersion of small ferromagnetic particles previously described. A suitable reference on the characteristics and preparation of magnetic thin films is "Magnetic Thin Films," Ronald F. Soohoo, Harper & Row, New York City, N.Y. (1965) L/C QC 761 S654; L/C Card No. 65–10123.

What is claimed is:

1. A mechanical motion damper comprising:
   (a) an external housing of nonmagnetic material having a hollow space inside it;
   (b) a shell of diamagnetic material surrounding the hollow space within the said hollow housing;
   (c) a shell of hysteretic magnetic material surrounding the hollow space within the said hollow housing;
   (d) a permanent magnetic structure within the said hollow space having a net magnetic moment, sufficiently small to move freely within the said hollow space, and having magnetic poles opposed to the said shell of diamagnetic material to be repelled thereby;
   (e) the proportioning of the dimensions of the said shell of diamagnetic material and of the said shell of hysteretic magnetic material being such that the repulsion of the said poles by the said diamagnetic material exceeds in magnitude the attraction of the said poles by the said hysteretic material, producing a net repulsion of the said poles toward the said hollow space.

2. In a mechanical motion damper comprising a permanent magnetic structure which is kept free to move with respect to a diamagnetic structure by repulsion by the said diamagnetic structure, the improvement which comprises hysteretic magnetic material fixed with respect to the said diamagnetic structure and exposed to the magnetic field of the said permanent magnetic structure, of such dimensions and effective permeability that the attraction between the said hysteretic magnetic material and the said permanent magnetic structure is less in magnitude than the said repulsion.

3. The device claimed in claim 1 in which the said shell of hysteretic magnetic material comprises a dispersion of fine particles of hysteretic magnetic material in a nonmagnetic material.

4. The improvement claimed in claim 2 in which the said hysteretic magnetic material is in the form of a dispersion of fine particles of hysteretic magnetic material in a nonmagnetic material.

5. The device claimed in claim 1 in which the said shell of hysteretic magnetic material is in the form of a thin film.

6. The improvement claimed in claim 2 in which the said hysteretic magnetic material is in the form of a thin film.

References Cited

UNITED STATES PATENTS

| | | | |
|---|---|---|---|
| 3,358,945 | 12/1967 | Blount | 310—93 |
| 3,073,170 | 1/1963 | Slater | 310—93 |
| 3,365,248 | 1/1968 | Zedekar | 308—10 |
| 3,370,205 | 2/1968 | Dures | 244—155 |
| 3,399,317 | 8/1968 | Davis | 308—10 |

WARREN E. RAY, Primary Examiner

R. SKUDY, Assistant Examiner

U.S. Cl. X.R.

244—1